3,192,234
SYNTHESIS OF FLUORO-ANALOGUES
OF GRISEOFULVIN
Chan-hwa Kuo and David Taub, Metuchen, and Norman L. Wendler, Summit, N.J., assignors to Merck & Co., Inc., Rahway, N.J., a corporation of New Jersey
No Drawing. Filed Nov. 6, 1961, Ser. No. 150,145
5 Claims. (Cl. 260—346.2)

This invention relates to a method of making a new antifungal agent. More particularly, it relates to a synthesis of 7-fluoro-7-dechlorogriseofulvin. Still more particularly, it relates to a chemical synthesis of 7-fluoro-7-dechlorogriseofulvin from norgriseofulvic acid. It relates further to the novel compounds obtained and utilized as intermediates in this synthesis.

Griseofulvin is a well-recognized antifungal agent having the structural formula

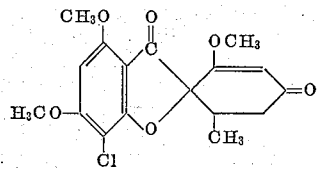

7-fluoro-7-dechlorogriseofulvin, wherein the chlorine atom of griseofulvin is replaced by a fluorine atom is likewise a highly active antifungal agent. It is an object of this invention to provide a synthesis of such griseofulvin analog wherein the chloro substituent of griseofulvin itself has been replaced by a fluoro substituent. It is a further object to provide a synthesis which leads directly to the physiologically active stereo isomer of 7-fluoro-7-dechlorogriseofulvin, in contrast to earlier syntheses which resulted in production of the racemic form of the compound. Since only one of the optical isomers possesses antifungal activity, the direct production of such isomer is of importance since the necessity of resolution of racemic isomers is thereby obviated. Other objects of this invention, including provision of chemical intermediates useful in the herein described synthesis of 7-fluoro-7-dechlorogriseofulvin, will be apparent from the ensuing discussion.

According to the present invention, it has now been discovered that 7-fluoro-7-dechlorogriseofulvin may be produced from norgriseofulvic acid by the process set forth in the following flow sheet. Norgriseofulvic acid is prepared fro mgriseofulvin itself as described by Grove et al., J. Chem. Soc. 3949 (1952).

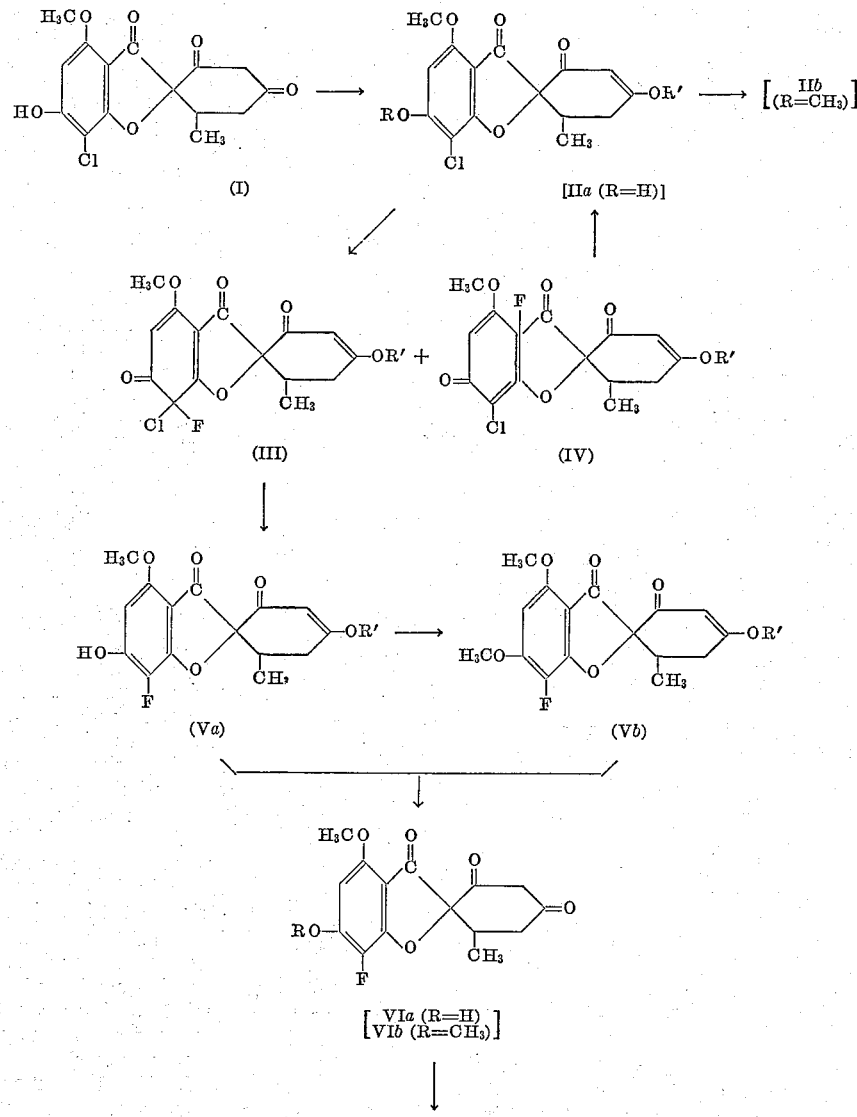

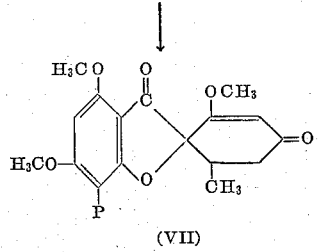

(VII)

In the above flowsheet, R represents hydrogen or methyl and R' represents a lower alkyl radical.

In the first step of this process, norgriseofulvic acid is reacted with a lower alkanol in the presence of an acidic catalyst to produce 7-chloro-6-hydroxy-4-methoxy-4'-loweralkoxy-6'-methyl-gris-3'-ene-3,2'-dione of Formula IIa. The nomenclature employed for describing this compound and the other compounds of this invention is that recommended by Grove et al., J. Chem. Soc. 3977 (1952). The lower alkanol may be any one of those known to those skilled in this art such as methanol, ethanol, propanol, butanol, isobutanol and the like. It is preferred to employ isopropanol, with resultant formation of Compound IIa where R' is an isopropyl radical, since the compounds thus produced crystallize readily and are conveniently manipulated in the ensuing reactions. The reaction of the norgriseofulvic acid and lower alkanol is brought about in the presence of an acidic catalyst such as p-toluene sulfonic acid, 2,4-dinitrobenzenesulfonic acid, sulfuric acid or trifluoroacetic acid. It is further preferred to carry out the process in an organic solvent inert under the reaction conditions. Aromatic hydrocarbons, such as benzene, toluene, xylene and the like, serve as convenient solvents since they permit convenient separation of the water of reaction via azeotropic distillation. Thus, the reaction is preferably conducted at reflux temperature and the water-organic solvent azeotrope continuously removed. The reaction times and temperatures are not unduly critical and formation of Compound IIa is conveniently brought about at temperatures of about 75–150° C. over periods of about 2–10 hours. In this way there are produced compounds such as 7-chloro-6-hydroxy-4,4'-dimethoxy-6'-methyl-gris-3' - ene - 3,2'-dione, 7-chloro-6-hydroxy-4-methoxy-4'-ethoxy-6' - methyl - gris - 3' - ene-3,2'-dione, 7-chloro-6-hydroxy - 4 - methoxy-4'-isopropoxy-6'-methyl-gris-3'-ene-3,2'-dione and 7-chloro-6-hydroxy-4-methoxy-4'-butoxy-6'-methyl-gris-3'-ene-3,2'-dione.

In the next step of the process of this invention, the compound of Formula IIa is treated with perchloryl fluoride to form the fluoro Compounds III and IV. This reaction is carried out in a basic solvent medium and it is preferred to employ basic organic solvents such as dimethylformamide, pyridine, a picoline or a lutidine, or mixtures thereof. Perchloryl fluoride is only sparingly soluble in such reaction media so that it is preferred to carry out the reaction by passing a stream of perchloryl fluoride gas through the reaction medium at a relatively slow rate. On a laboratory scale the rate of addition can be measured visually and good results are achieved by adding the perchloryl fluoride at a rate of 1–5 bubbles/second. Although the temperature is not unduly critical, it is convenient to begin the reaction in the cold, i.e. at about 0–10° C., and to permit the reaction temperature to rise to about 25–30° C. Addition of perchloryl fluoride is continued until the starting material IIa is essentially completely consumed. Disappearance of starting material is conveniently determined by standard paper chromatography techniques. Fluorination of the phenol IIa occurs at both the 7- and 3a-positions of the molecule to give a mixture of Compounds III and IV. These polyhalogenated materials may, if desired, be separated and purified at this stage of the process by techniques such as fractional crystallization. However, according to a preferred method for carrying out the synthesis set forth in the above flowsheet, the two substances are not separated, but rather the mixture of reaction products is treated directly with a suitable reducing agent such as chromous chloride, chromous acetate or zinc in order to dechlorinate the 7-chloro-7-fluoro compound of Formula III and to defluorinate the 3-fluoro-7-chloro compound of Formula IV above. Thus, reaction of a mixture of Compounds III and IV leads to formation of a mixture of Compounds Va and IIa. From such latter mixture 7-fluoro-6-hydroxy-4-methoxy-4'-loweralkoxy-6'-methyl-gris-3'-ene-3,2'-dione (Va) and 7-chloro-6-hydroxy-4-methoxy-4'-loweralkoxy-6'-methyl-gris - 3' - ene - 3,2'-dione (IIa) may be obtained in substantially pure form by separation techniques such as fractional crystallization or chromatographic separation. The 7-fluorinated material (Va) is more polar than the 7-chloro Compound (IIa) and this difference in polarity may be used to advantage in separating the two substances.

7 - fluoro - 6 - hydroxy - 4 - methoxy - 4' - loweralkoxy-6'-methyl-gris-3'-ene-3,2'-dione is next treated with a methylating agent such as diazomethane to form 7-fluoro-4,6 - dimethoxy - 4' - loweralkoxy - 6' - methyl - gris - 3'-ene-3,2'-dione (Vb). For this reaction it is preferred to employ a solution of diazomethane in ether although this is not essential and any source of the methylating agent is satisfactory. The reaction itself is conveniently brought about in an inert solvent medium such as tetrahydrofuran, ether, benzene, toluene, methanol, ethanol and the like, preferably at temperatures of less than about 15° C. The reaction is substantially complete in from 6–15 hours although longer reaction times may be used if desired. This reaction, whereby the 6-hydroxy group is converted to a methyl ether function may be carried out on substantially pure 7-fluoro-6-hydroxy-4-methoxy - 4' - loweralkoxy - 6' - methyl - gris - 3' - ene-3,2'-dione or, in the alternative, a mixture of Va and the corresponding chloro Compound IIa may be used as starting material. In this latter instance the 7-chloro-6-methoxy Compound IIb will also be produced. The 7-fluoro and 7-chloro are separated by techniques such as fractional crystallization or preparative paper chromatography. It has been found very convenient to defer separation of the fluoro and chloro substances until this stage of the process and to separate them immediately after the diazomethane reaction discussed above using preparative paper chromatography with a ligroin-formamide solvent system. Thus, in a preferred embodiment of the invention, a mixture of Compounds IIa and Va is reacted with a molar excess of diazomethane and the resulting mixture of methylated substances separated into substantially pure IIb and Vb.

In the next step of our process for making 7-fluoro-7-dechlorogriseofulvin, 7 - fluoro - 4,6 - dimethoxy-4'-loweralkoxy-6'-methyl-gris-3'-ene-3,2'-dione is treated with a mineral acid to produce 7-fluoro-4,6-dimethoxy-6'-methyl--gris-3,2',4'-trione (VIb). This conversion is accomplished by intimately contacting the starting material with a mineral acid such as sulfuric acid, hydrochloric acid, phosphoric acid and the like at elevated temperatures for periods of from about ½ to 5 hours. According to a preferred embodiment of this step of the invention, the reaction is carried out in a mixture of acetic and sulfuric acid. When the reaction is complete, the acids, which normally serve as the solvent medium, are removed by concentration under reduced pressure and the resulting 7-fluoro-4,6-dimethoxy-6'-methyl-gris-3,2',4'-trione is recovered and purified by conventional techniques. This latter substance is finally converted to 7-fluoro-7-dechlorogriseofulvin (VII) by reaction with a methylating agent such as diazomethane under the same conditions as discussed above for the conversion of V$a$ to V$b$. Thus, an inert organic solvent solution of the trione VI$b$ is intimately contacted with a molar excess of a substance such as diazomethane, preferably in the cold. Upon completion of the reaction the excess diazomethane and the organic solvents are removed and the desired 7-fluoro-7-dechlorogriseofulvin recovered and purified by known methods.

According to an alternative method of obtaining 7-fluoro-7-dechlorogriseofulvin, 7-fluoro-6-hydroxy-4-methoxy-4'-loweralkoxy-6'-methyl-gris-3'-ene-3,2'-dione (V$a$) is intimately contacted with a mineral acid at elevated temperatures under which conditions there is produced 7-fluoro-6-hydroxy-4-methoxy-6'-methyl-gris-3,2',4'-trione (VI$a$), and this latter material is reacted with at least 2 moles of a methylating agent such as diazomethane to form 7-fluoro-7-dechlorogriseofulvin directly. Thus, it will be seen from the above description of the invention that substance V$a$ may be transformed to the desired final product VII by either of two routes: first, by methylation at the 6-position prior to the conversion of the enol ether function at the 4'-position to a keto group, in which instance a subsequent methylation at the 4'-position is required. Alternatively, the enol ether may be removed before methylation of the 6-position, in which case one methylation reaction is employed to etherify the hydroxy group at the 6-position as well as to introduce a methoxy function in the 2'-position.

7-fluoro-7-dechlorogriseofulvin, produced as described above, is an active antifungal agent. Since the process of our invention does not affect any of the asymmetric centers of the molecule (which give rise to optical isomers), our synthesis gives exclusively the physiologically active optical isomer when the norgriseofulvic acid employed as starting material is obtained from the physiologically active form of griseofulvin.

The following examples are given for the purpose of illustration and not by way of limitation:

Example 1

A solution of 30 g. of norgriseofulvic acid and 500 mg. of p-toluene sulfonic acid in 3200 ml. of isopropanol and 1200 ml. of toluene is brought to the reflux temperature. The solvent and water of reaction are removed by azeotropic distillation at a rate of about 200 ml./hour for 6 hours. The solvent removed by distillation is replaced by fresh toluene. At the end of 6 hours the mixture is concentrated to dryness in vacuo and the resulting residue dissolved in a minimal amount of ethyl acetate. The ethyl acetate solution is washed with 50% saturated sodium chloride solution, dried over magnesium sulfate and concentrated to dryness. The residue is dissolved in acetone, and the acetone solution treated with decolorizing charcoal and then concentrated, after removal of the charcoal by filtration, until crystallization occurs. The acetone solution is then chilled and the crystals of 7-chloro-6-hydroxy-4-methoxy-4'-isopropoxy-6'-methyl-gris-3'-ene-3,2'-dione recovered by filtration and dried. They have M.P. 282–284° C.;

$\lambda_{max.}^{MeOH}$ 324 m$\mu$(10,000), 291 m$\mu$(17,200), 265 m$\mu$(21,200) 234 m$\mu$(16,400); $\lambda_{max.}^{Chf.}$ 5.91, 6.19, 6.23, 6.35$\mu$

Example 2

To a stirred solution of 2 g. of 7-chloro-6-hydroxy-4-methoxy-4'-isopropoxy-6'-methyl-gris-3'-ene-3,2'-dione in 18 ml. of dimethylformamide and 2 ml. of pyridine there is added at 0° C. perchloryl fluoride gas at the rate of about 1–2 bubbles/second. After 30 minutes of gas addition the temperature is allowed to rise to about 25° C. and perchloryl fluoride addition is continued at that temperature for 48 hours. Gas addition is then stopped and nitrogen bubbled through the reaction mixture for 5 minutes. 15 ml. of saturated salt solution and 2.5 N hydrochloric acid sufficient to make the mixture acidic are then added. The resulting mixture is extracted with 2 x 20 ml. of 1:1 ethyl acetate-benzene. The organic extracts are combined, washed with saturated salt solution, dried over magnesium sulfate and concentrated to dryness in vacuo. The residue thus obtained is a mixture of 7-chloro-7-fluoro-4-methoxy-4'-isopropoxy-6,7-dihydro-6'-methyl-gris-3'-ene-3,6,2'-trione and 3a-fluoro-7-chloro-4-methoxy-4'-isopropoxy-3a,6-dihydro-6'-methyl-gris-3'-ene-3,6,2'-trione;

$\lambda_{max.}^{Chf.}$ 5.65, 5.82, 6.00, 6.30$\mu$

Example 3

2.1 g. of the product obtained in Example 2 is dissolved in 20 ml. of acetic acid and 2 g. of zinc dust is added to such solution at 20° C. with stirring. After 30 minutes an additional 2 g. of zinc dust is added. The mixture is then stirred for a further 90 minutes, filtered and concentrated almost to dryness. The concentrate is then extracted with 2 x 10 ml. of 2:1 ethyl acetate-benzene. The organic extracts are combined, washed with water and dried over magnesium sulfate. The solvent is then removed to give a residue of 7-fluoro-6-hydroxy-4-methoxy-4'-isopropoxy-6'-methyl-gris-3'-ene-3,2'-dione and 7-chloro-6-hydroxy-4-methoxy-4'-isopropoxy-6'-methyl-gris-3'-ene-3,2'-dione.

This residue is dissolved in 10 ml. of tetrahydrofuran and the solution cooled to 0° C. Excess diazomethane in ether is added and the resulting mixture held at 0–5° C. for 15 hours. (The diazomethane in ether is prepared by adding 4 g. of N-nitroso-N-methylurea to 50 ml. of ether and 50 ml. of 10% aqueous potassium hydroxide at 0° C. with stirring, decanting the ether layer and drying it over potassium hydroxide pellets at 0° C.) The mixture is then concentrated to dryness and chromatographed over 100 g. of neutral alumina. The column is eluted with benzene and the benzene eluates concentrated to dryness to give a residue which is crystallized from ether-petroleum ether. The resulting crystals, having a M.P. 148–150° C., are resolved by preparative paper chromatography using Whatman #4 paper and a ligroin-formamide system into substantially pure 7-fluoro-4,6-dimethoxy-4'-isopropoxy-6'-methyl-gris-3'-ene-3,2'-dione and 7-chloro-4,6-dimethoxy-4'-isopropoxy-6'-methyl-gris-3'-ene-3,2'-dione. The 7-fluoro compound is the more polar of the two and is obtained as the major product. The 7-chloro compound is the less polar and is obtained as the minor product. The 7-fluoro compound has M.P. 143–146° C.;

$\lambda_{max.}^{MeOH}$ 323 m$\mu$(5,300) 288 m$\mu$(19,000), 268 m$\mu$(22,800) shd. 230 m$\mu$(12,700)

The 7-chloro compound has M.P. 191–194° C.;

$\lambda_{max.}^{MeOH}$ 324 m$\mu$(5,300), 290 m$\mu$(20,200), 268 m$\mu$(21,900) 233 m$\mu$(18,400)

The preparative paper chromatography procedure employed above is similar to the one described in Example 4.

Example 4

2.8 g. of the diazomethane reaction product of Example 3 (the product having M.P. 148–150° C.) is refluxed for 1 hour in 28 ml. of acetic acid and 6 ml. of 2 N sulfuric acid. The mixture is then concentrated to a small volume in vacuo and the residue dissolved in 20 ml. of ethyl acetate. The ethyl acetate solution is extracted with an equal volume of 5% aqueous potassium bicarbonate. The bicarbonate solution is acidified with cold 2.5 N hydrochloric acid and extracted with 10 ml. of ethyl acetate. This latter ethyl acetate extract is washed with saturated sodium chloride solution, dried over magnesium sulfate and concentrated to dryness in vacuo. The residue thus obtained is crystallized from acetone-ether to give substantially pure 7-fluoro-4,6-dimethoxy-6'-methyl-gris-3,2',4'-trione, M.P. 233–236° C. This substance is treated with diazomethane as described in Example 3 and the product obtained on crystallization from acetone-ether is substantially pure 7-fluoro-4,6,2'-trimethoxy - 6' - methyl - gris - 2' - ene - 4' - one (7 - fluoro-7-dechlorogriseofulvin), M.P. 202–208° C.

This latter material is purified by paper chromatography using Whatman #4 paper, a ligroin-formamide system, 10 mg./6" x 18" sheet. After 18 hours of development the most polar fluorescent band is cut out, extracted with methanol and the methanol extract, after filtration, concentrated to near dryness. The residue is dissolved in the minimal amount of chloroform and the chloroform solution washed with water. It is then dried over magnesium sulfate and concentrated to dryness in vacuo. Crystallization of the residue from acetone-ether gives pure 7-fluoro-7-dechlorogriseofulvin, M.P. 210–212° C.;

$[\alpha]_D^{Chf.}$ +316° C., $\lambda_{max.}^{MeOH}$ 325 m$\mu$ (4,600), 190 m$\mu$ (21,200) infl. 245 m$\mu$ (14,100), 235 m$\mu$ (15,000); $\lambda_{max.}^{Chf.}$ 5.83, 6.00 6.16, 6.26, 6.49, 7.85$\mu$ Any departure from the above description which conforms to the present invention is intended to be included within the scope of the claims.

What is claimed is:

1. The process for producing 7-fluoro-6-hydroxy-4-methoxy - 4' - loweralkoxy - 6' - methyl - gris - 3' - ene-3,2'-dione that comprises reacting 7-chloro-6-hydroxy-4-methoxy - 4' - loweralkoxy - 6' - methyl - gris - 3' - ene-3,2'-dione with perchloryl fluoride in a basic reaction medium, thereby producing a mixture comprising 7-chloro-7 - fluoro - 4 - methoxy - 4' - loweralkoxy - 6,7 - dihydro-6' - methyl - gris - 3' - ene - 3,6,2' - trione and 3a-fluoro-7 - chloro - 4 - methoxy - 4' - loweralkoxy - 3a,6 - dihydro - 6' - methyl - gris - 3' - ene - 3,6,2' - trione, and contacting said mixture with a member of the group consisting of chromus chloride, chromous acetate, and zinc.

2. The process for producing 7-fluoro-6-hydroxy-4-methoxy - 4' - isopropoxy - 6' - methyl - gris - 3' - ene-3,2' - dione that comprises reacting 7 - chloro - 6 - hydroxy - 4 - methoxy - 4' - isopropoxy - 6' - methyl - gris-3' - ene - 3,2' -dione with perchloryl fluoride in a basic reaction medium, thereby producing a mixture comprising 7 - chloro - 7 - fluoro - 4 - methoxy - 4' - isopropoxy - 6,7-dihydro - 6' - methyl - gris - 3' - ene - 3,6,2' - trione and 3a - fluoro - 7 - chloro - 4 - methoxy - 4' - isopropoxy - 3a,6 - dihydro - 6' - methyl - gris - 3' - ene - 3,6,2' - trione, and contacting said mixture with zinc.

3. A compound of the formula

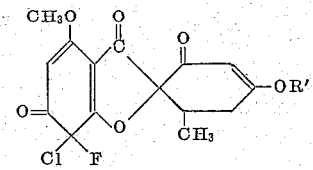

where R' represents lower alkyl.

4. A compound of the formula

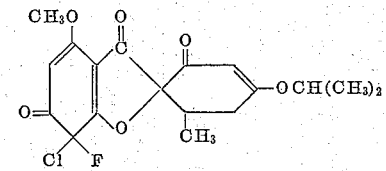

5. A compound of the formula

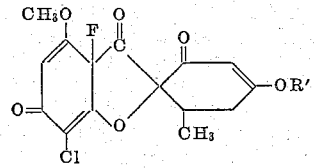

where R' represents lower alkyl.

References Cited by the Examiner

UNITED STATES PATENTS 3,113,970 12/63 Slates et al. ---------- 260—346.2
3,114,753 12/63 Brossi et al. ---------- 260—346.2

OTHER REFERENCES

Duncanson et al.: J. Chem. Soc., London (1958), pages 2929–33.

Grove et al.: J. Chem. Soc., London (1952), pages 3951 and 3956.

Oxford et al.: J. Biochem., volume 33 (1939), pages 240, 242, and 245–7.

NICHOLAS S. RIZZO, *Primary Examiner.*

IRVING MARCUS, WALTER A. MODANCE,
*Examiners.*